H. F. JERAULD.
DRAFT EQUALIZER FOR THREE HORSES.

No. 112,715. Patented Mar. 14, 1871.

Attest
Wm H Brereton
H. C. Elliott

Inventor
Henry F Jerauld
By Knight Bros Attys

UNITED STATES PATENT OFFICE.

HENRY F. JERAULD, OF VANDALIA, ILLINOIS, ASSIGNOR TO JERAULD & STOLLE, OF SAME PLACE.

Letters Patent No. 112,715, dated March 14, 1871.

---

IMPROVEMENT IN DRAFT-EQUALIZERS FOR THREE HORSES.

The Schedule referred to in these Letters Patent and making part of the same.

---

I, HENRY F. JERAULD, of Vandalia, in the county of Fayette and State of Illinois, have invented a certain Improved Clevis for Gang-Plows, &c., of which the following is a specification.

Nature and Object of the Invention.

My invention relates to a three-horse clevis for gang-plows, and consists of a certain arrangement and combination of parts to enable the draft to be easily adjusted between the single-tree of the middle horse and the double-tree of the two outer horses.

Figure 1:
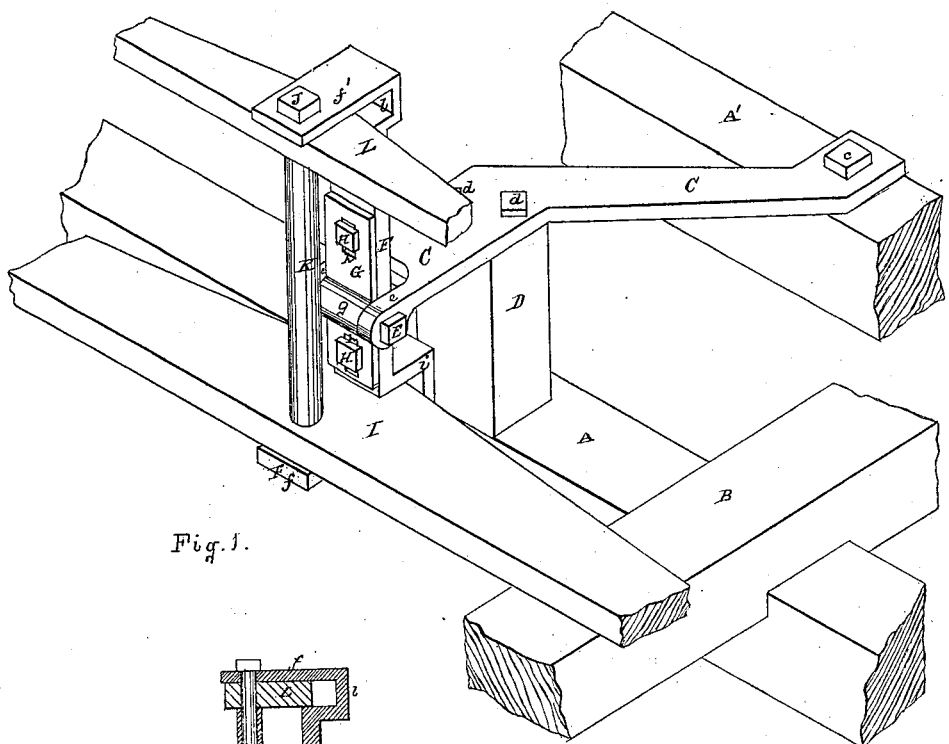
Figure 1 is a view of my clevis in isometric perspective.
Figure 2:
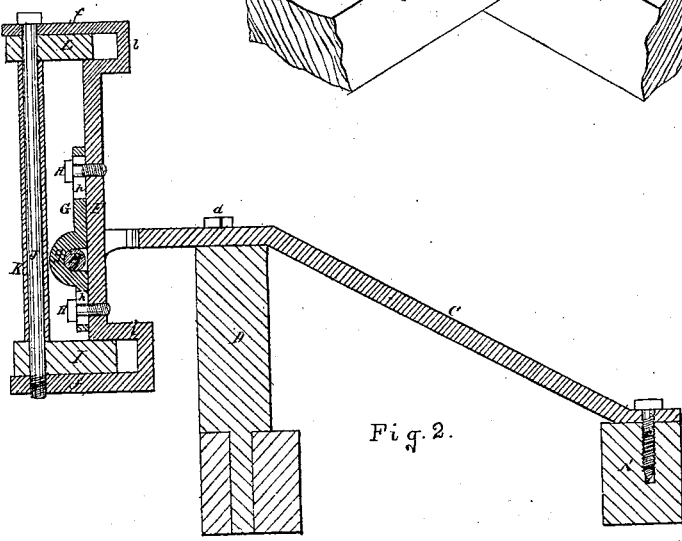
Figure 2 is a longitudinal vertical section of the same.

General Description.

A and A' are cross-ties or bars of the frame, their ends being shown broken off.

B is a portion of the tongue, which is attached to both cross-ties, and extends forward between the middle horse and one of the outside horses.

C is a clevis plate or strap, whose rear end is attached by a bolt, c, to the cross-tie A', and which is attached to the top of the post D upon the cross-tie A by bolts d.

The forward end of the strap is forked, and has two ears, e, through which passes a horizontal pin or bolt, E.

The clevis-bar F rests against the rear side of the bolt E, between the ears e.

The clevis-bar F is held in position upon the bolt E by a strap, G, which has a round bend, g, forming a cavity that receives the bolt.

The strap G is secured to the bar F by two set-screws, H, passing through vertical slots, h, in the strap, and screwing into the bar E.

The lower end, f, of the bar F, extends forward in a horizontal direction, and sustains the double-tree I.

A backward bend, i, of the bar allows the oscillation of the double-tree.

The double-tree is pivoted on a clevis-pin, J, that forms also the pivot of the single-tree L, which is immediately beneath the upper horizontal end f' of the clevis-bar F.

The single-tree L and the double-tree are held asunder by a sleeve, K, surrounding the clevis-pin J, between the two trees.

A backward bend, l, of the bar F, allows the play of the single-tree.

The comparative amount of draft between the two horses harnessed to the double-tree, and the one to the single-tree, is adjusted by raising or lowering the bar F upon the strap G and pivot-pin E, the slots h and screws H giving means of adjustment.

The clevis is for use in working three horses to a gang-plow, reaping-machine, or other implement, and allows the easy apportionment of leverage to regulate the draft as described.

I have shown a sleeve, K, as the best means of keeping the double-tree and single-tree separate and in their proper positions; but they might be secured in position by extra lugs or ears projecting forward from the clevis-bar F, or by other means.

Claims.

I claim as my invention—

1. The strap C, bar F, strap G, pins E and J, and double and single-trees I and L, all combined and arranged substantially as set forth.

2. In combination with the elements C, F, G, E, J, I, and L, the sleeve K, as described.

In testimony of which invention I have hereunto set my hand.

HENRY F. JERAULD.

Witnesses:
SAML. KNIGHT,
HENRY VONESCHEN.